Figure 1:
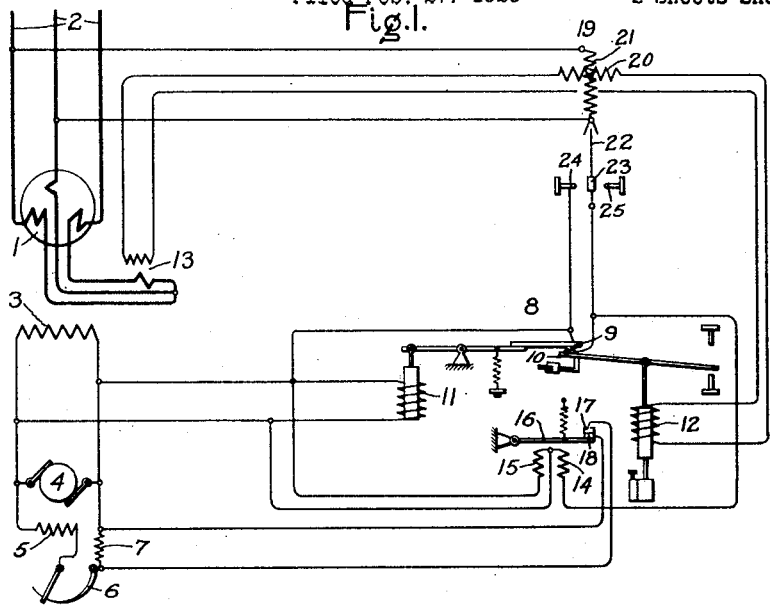

April 10, 1928.

M. HERKLOTZ 1,665,852

REGULATING SYSTEM

Filed Feb. 27, 1926

2 Sheets-Sheet 1

Inventor:
Max Herklotz,
by
His Attorney.

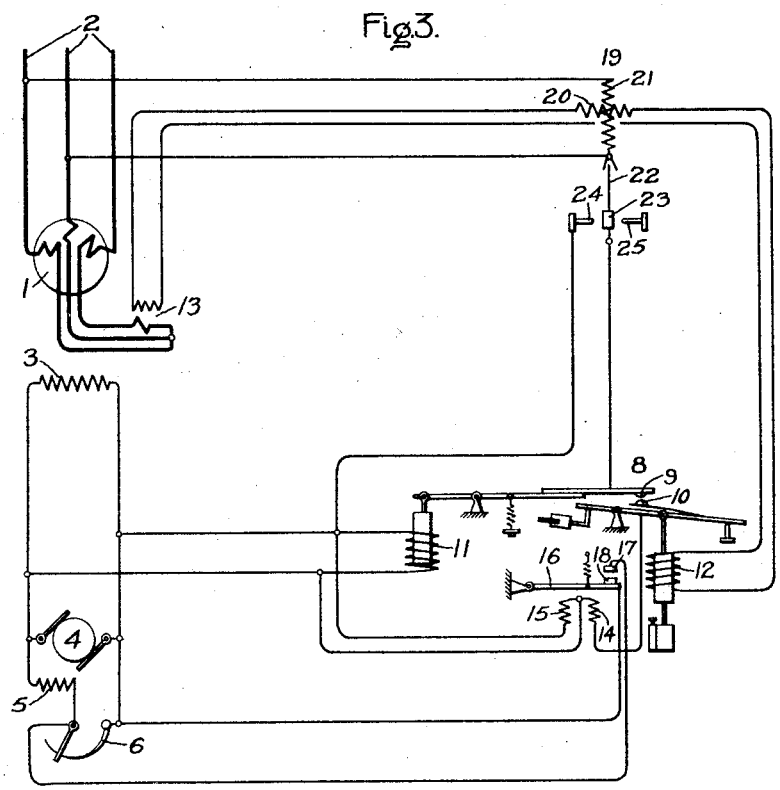

Patented Apr. 10, 1928.

1,665,852

UNITED STATES PATENT OFFICE.

MAX HERKLOTZ, OF BERLIN, GERMANY, ASSIGNOR TO GENERAL ELECTRIC COMPANY, A CORPORATION OF NEW YORK.

REGULATING SYSTEM.

Application filed February 27, 1926, Serial No. 91,213, and in Germany March 26, 1925.

My invention relates to regulating systems for controlling an electrical condition of alternating current dynamo-electric machines and particularly to a system for controlling a characteristic of the output of an alternating current generator in which the characteristic, which may be the voltage, current, power, power factor, etc., is controlled by varying the excitation of an exciter which supplies exciting current to the generator.

The present invention is of particular utility in systems for controlling the current output of an alternating current generator operating in parallel with other alternating current generators, or in systems in which alternating current dynamo-electric machines are connected to a load circuit requiring under certain operating conditions a large leading current and under other operating conditions a large lagging current.

In a case in which two alternating current generators are operated in parallel, a change in the field excitation of one machine merely shifts the division of reactive current between the machines but does not change appreciably the kilowatt load carried by the respective machines. If the excitation of the first machine is decreased the reactive current with respect to the terminal voltage of this machine will be leading while the reactive current of the second machine will be lagging. A further decrease in the excitation of the first machine will merely increase the leading component of current in that machine. If, therefore, the generator current is plotted in a diagram with respect to the excitation current, there results the well known phase characteristic or V-curve, with a minimum generator current for a particular excitation at which the power factor is unity. Decreased or increased excitation from this point of minimum current results in a leading or lagging power factor. It is therefore apparent that if the current output of the generator is controlled by a regulator operating to decrease or increase the generator excitation, a continued decrease of the excitation, in the particular case considered, would increase the total current, and a current regulator would be of no protective value.

An object of my invention is to provide an improved regulating arrangement for alternating current dynamo-electric machines in which automatic control of an output characteristic is effected when another characteristic of the machine is of a predetermined character, and in which the operation of the automatic controlling means is rendered ineffective when said other characteristic is of another predetermined character.

Briefly stated, an embodiment of my invention consists in providing an alternating current dynamo-electric machine with a current regulator of the Tirrill-type which operates to increase or decrease the field excitation of the machine when its power factor is of a predetermined character, for example, when the power factor is lagging. The operation of the current regulator, however, is rendered ineffective by means of a power factor meter when the power factor of the machine is of another predetermined character, for example, when the power factor is leading.

The nature of my invention and its mode of operation will be better understood by reference to the following description taken in connection with the accompanying drawings while its scope will be pointed out in the appended claims.

Figure 2:
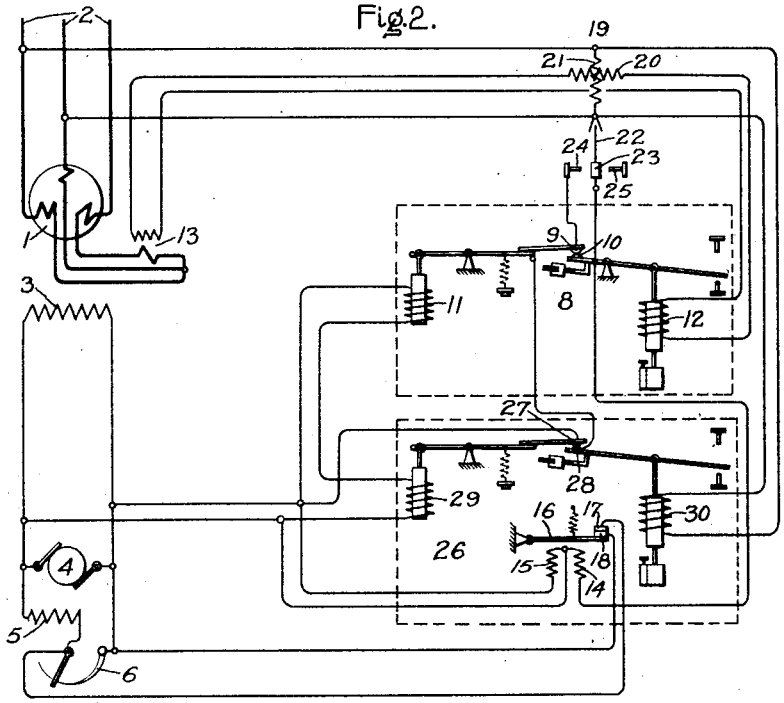

In the drawings, Fig. 1 is a diagrammatic illustration of an embodiment of my invention for controlling an alternating current generator provided with a current regulator; Fig. 2 shows an arrangement similar to that shown in Fig. 1 with the addition of voltage regulating means, and Fig. 3 shows a modification of the arrangement shown in Fig. 1.

Referring first to the Fig. 1 of the drawings, 1 indicates an alternating current generator connected to a distribution system comprising conductors 2 to which a number of other generators or translating device (not shown) may be connected. Generator 1 is provided with a field winding 3 which is energized by an exciter 4. The exciter 4 is provided with a shunt field winding 5 in circuit with which is an adjustable rheostat 6 and a resistor 7. The amount of resistance in the field circuit of the exciter may be adjusted by the adjustable rheostat 6. The voltage of the exciter is arranged to be controlled by alternately short-circuiting and inserting the resistor 7 in the exciter field circuit by means of a vibratory regulator 8, such as a Tirrill type, or any other similarly sensitive type of vibratory regulator.

The regulator 8, as shown, is of the well known construction comprising two cooperating contacts 9 and 10 which are actuated respectively by a direct current magnet 11 connected across the exciter 4, and an alternating current magnet 12 connected to the alternating current circuit 2 by means of a current transformer 13. The two contacts 9 and 10 are connected in a circuit for one of the windings of the usual differential relay comprising windings 14 and 15. This circuit through contacts 9 and 10, and winding 14 is connected across exciter 4. The other winding 15 of the differential relay is permanently connected across the exciter 4. The differential relay has a pivoted arm 16 which is arranged to close contacts 17 and 18 when both windings 14 and 15 are energized thereby short circuiting the resistor 7 in the field circuit of exciter 4.

The operation of the regulator shown is well known in the art. It is evident that the exciter voltage is controlled by the rapid opening and closing of contacts 9 and 10 and that the exciter voltage depends upon the length of time the contacts remain in engagement during each vibration. Furthermore, it is evident that the length of time the contacts 9 and 10 remain in engagement depends upon the current in generator 1. At any constant current contact 10 remains stationary and contact 9 vibrates so that the regulator acts as a direct current regulator to maintain the proper exciter voltage. When the current of generator 1 increases, contact 10 moves away from contact 9. Consequently contacts 9 and 10 are in engagement a less portion of the time during each vibration of contact 9. Therefore the resistor 7 is short circuited for a shorter interval of time so that the excitation is decreased and the current of the generator changed in value.

If the generator current is lagging, a decrease of excitation will decrease the total current, but when the point of minimum current consumption is reached a further decrease of excitation will increase the total current until the generator will be delivering a large and probably prohibitive leading current.

Therefore, it is very desirable that suitable means be provided for modifying or rendering ineffective the operation of the current regulator when the power factor is of a predetermined character, and in this particular case when the power factor is leading.

In order to accomplish this result, I have shown in Fig. 1 an arrangement whereby the regulator is effective to regulate the generator excitation when the power factor is lagging, but rendered ineffective to regulate the generator excitation when the power factor is leading. My improved arrangement consists in providing a device 19 to short circuit the main contacts 9 and 10 of regulator 8 when the alternating current is leading.

As shown, device 19 is represented as a contact-making power-factor meter which may be an ordinary standard instrument having a stationary coil 20 and one or more movable coils 21. The stationary coil is in this case the current coil and is connected by a current transformer 13 to one of the phase conductors of generator 1. The movable coil 21 is connected across one phase of the generator terminals and is arranged to actuate an arm 22 provided with a contact 23 which is arranged to engage either a contact 24 or a contact 25. Contacts 23 and 24 are connected respectively to contacts 10 and 9 of regulator 8. As the construction of a standard power factor meter is well known, no further description is thought to be necessary.

The operation of the arrangement shown in Fig. 1 will be effected substantially as described until the current in the generator is leading. Arm 22 of power-factor meter 19 is then arranged to move its contact 23 into engagement with contact 24 and thereby short circuit contacts 9 and 10. Thereafter any operation of regulator 8 will be suspended so long as contacts 23 and 24 are in engagement, and in this case so long as the condition of leading power factor exists. However, if the power factor is unity or lagging the arm 22 will assume a mid-position or move into engagement with contact 25 permitting, in either position, the normal operation of regulator 8.

Fig. 2 shows a regulating system in which my invention has been embodied with means for regulating the voltage as well as controlling the current. Like parts are designated by the same numerals used in Fig. 1. A vibratory voltage-regulator of the Tirrill-type is designated by 26 and comprises two cooperating contacts 27 and 28 which are actuated respectively by a direct current magnet 29 connected across the exciter 4 and an alternating current magnet 30 connected across one phase of the generator terminals. Contacts 23 and 24 of the power-factor meter 19 are again placed in parallel with the main contacts 9 and 10 of current regulator 8 and are arranged to be closed when the power factor is leading. Contact 9 of relay 8 is not connected directly to the exciter bus as in Fig. 1 but is connected to contact 28, through contact 27, to the exciter bus. In other words, the main contacts 9 and 10 of current regulator 8 are in a series circuit with contacts 27 and 28 of the voltage regulator 26.

The operation of the regulating system shown in Fig. 2 is similar to the arrangement shown in Fig. 1 up to a certain point in the cycle of operation, and it is believed that a description of such additional operating features as are peculiar to this embodiment will be sufficient to set forth clearly the operation. When the power factor of generator 1 is leading, contacts 23 and 24 of power-factor meter 19 are arranged to be closed and short circuit the main contacts 9 and 10 of regulator 8. This will suspend the operation of the current regulator but voltage regulator 26 will still operate to regulate the voltage of generator 1 in a manner well known. This will be apparent when it is observed that the engagement of contacts 27 and 28 of voltage regulator 26 will complete a circuit for coil 14 of its differential relay and permit contacts 17 and 18 to short circuit the resistance in the field circuit of exciter 4 and thereby raise the generator voltage. As contacts 27 and 28 are disengaged the circuit for coil 14 is interrupted and contacts 17 and 18 are opened to introduce resistance in the field circuit of exciter 4 to lower the generator voltage. With unity power factor or a lagging power factor, the contacts 9 and 10 of the current regulator are again free of the shunting circuit through contacts 23 and 24 and the generator will be regulated in accordance with the operation of current regulator 8 and voltage regulator 26.

In Fig. 3 a regulating arrangement is shown which is a modification of the system shown in Fig. 1. In this case the operation of the current regulator 8 is effective when the power factor is leading and is suspended when the power factor is lagging. Similar parts are designated by the same numerals used in Fig. 1. It will be observed, however, that main contacts 9 and 10 of the current regulator are in series instead of in parallel with contacts 23 and 24 of the power-factor meter. Moreover, the main contacts 9 and 10, as regards their position relatively to the center of rotation of the alternating-current magnet lever in Fig. 1, are arranged conversely.

This arrangement would find application where it is desired to suspend the operation of the current regulator when the current is lagging, that is, when the excitation of a generator has been increased above that value of field current required for the minimum current input. However, when the generator is under-excited the current regulator is arranged to function so as to increase the field excitation and thereby decrease the generator current. For example, if the generator is underexcited it will have a leading component of current and contacts 23 and 24 of power factor 19 will be arranged to close. The alternating current coil 12 will raise contact 10, and contacts 9 and 10 will be in engagement a greater length of time. With contacts 23 and 24 closed and contacts 9 and 10 closed, coil 14 is energized and permits contacts 17 and 18 to close. This operation of contacts 17 and 18 reduces the effective resistance in the field circuit of exciter 4 and permits an increase in the generator excitation. This decreases the leading component of the generator current and reduces the current flow from the generator. If the power factor is unity or the generator is over-excited so as to have a lagging component of current, contacts 23 and 24 will be opened and the operation of regulator 8 will be ineffective to change the field excitation.

While I have shown and described three modifications of my invention, it will be readily seen that various changes and other modifications may be made, and I, accordingly desire to cover in the appended claims all changes and modifications that fall within the true spirit and scope of my invention

What I claim as new and desire to secure by Letters Patent of the United States is:

1. In combination, an alternating current dynamo-electric machine, means normally arranged to control an electrical condition of said machine, and means responsive to said controlled condition and to another electrical condition of said machine for rendering said first mentioned means ineffective to control said machine upon the occurrence of a predetermined relation between said conditions.

2. In combination, an alternating current dynamo-electric machine, means normally arranged to control an electrical condition of said machine, and means responsive to the power factor of said machine for rendering said first mentioned means ineffective to control said electrical condition when said power factor is of a predetermined character.

3. In combination, an alternating current generator, means for controlling an electrical characteristic of the output of said generator, and means responsive to the current of said generator for rendering said first mentioned means inoperative to control said electrical characteristic upon the occurrence of a predetermined phase relation between the current and voltage of said generator.

4. The combination of an alternating current generator, means for controlling the current output of said generator, and means responsive to the power factor of said generator for rendering said current controlling means ineffective to control said generator when said power factor is of a predetermined character.

5. The combination of an alternating current dynamo-electric machine, means for controlling an electrical condition of said machine, means cooperating with said first-mentioned means for controlling another electrical condition of said machine, and means responsive to the current and voltage of said machine for modifying the operation of said controlling means.

6. The combination of an alternating current generator, means for controlling the current output of said generator, means for controlling the voltage of said generator, and means responsive to the power factor of said generator for rendering said current controlling means ineffective to control said generator when said power factor is of a predetermined character.

7. In a regulating system, an alternating current machine, an exciter therefor, a pair of cooperating contacts normally arranged to control by their engagement and disengagement the excitation of said exciter, means operative in response to an electrical condition of said machine for actuating one of said contacts, a magnet operative in response to a predetermined characteristic of said exciter for actuating the other of said contacts, and means responsive to the power factor of said generator for rendering said excitation controlling means ineffective to control said machine when said power factor is of a predetermined character.

8. In a regulating system, an alternating current generator, an exciter therefor, a pair of cooperating contacts normally arranged to control by their engagement and disengagement the excitation of said exciter, a magnet responsive to the current output of said generator for actuating one of said contacts, a magnet responsive to the voltage of said exciter for acutating the other of said contacts, auxiliary contacts in a circuit with said cooperating contacts, and means responsive to the power factor of said generator for controlling the engagement of said auxiliary contacts to control said excitation controlling means when said power factor is of a predetermined character.

9. In a regulating system, an alternating current generator, an exciter therefor, a pair of cooperating contacts normally arranged to control by their engagement and disengagement the excitation of said exciter, a magnet responsive to the current output of said generator for actuating one of said contacts, a magnet responsive to the voltage of said exciter for actuating the other of said contacts, and a contact-making power-factor meter for completing a short-circuit around said cooperating contacts when the power factor of said generator is leading.

In witness whereof, I have hereunto set my hand this 8th day of February, 1926.

MAX HERKLOTZ.